United States Patent [19]
Kooken et al.

[11] Patent Number: 5,644,181
[45] Date of Patent: Jul. 1, 1997

[54] STATOR LAMINATION DESIGN HAVING A TAPERED OPENING

[75] Inventors: Gale A. Kooken, Englewood; John W. Murphy, Kettering; Roger D. Fleming, Centerville, all of Ohio

[73] Assignee: Dayton-Phoenix Group, Inc., Dayton, Ohio

[21] Appl. No.: 369,097

[22] Filed: Jan. 5, 1995

[51] Int. Cl.$^6$ .................................................. H02K 1/00
[52] U.S. Cl. ........................... 310/216; 310/214; 310/215; 29/596
[58] Field of Search .................................... 310/214, 215, 310/216; 29/596

[56] References Cited

U.S. PATENT DOCUMENTS

| | | | |
|---|---|---|---|
| 3,508,093 | 4/1970 | Obukhov | 310/216 |
| 4,572,980 | 2/1986 | Anderson et al. | 310/214 |
| 4,607,183 | 8/1986 | Rieber et al. | 310/214 |
| 4,633,574 | 1/1987 | Bath et al. | 29/596 |
| 4,704,787 | 11/1987 | Herzog et al. | 29/596 |
| 4,976,469 | 12/1990 | Khutoretsky et al. | 310/52 |
| 5,030,871 | 7/1991 | Shah et al. | 310/261 |
| 5,365,135 | 11/1994 | Konrad et al. | 310/214 |
| 5,469,009 | 11/1995 | Wakui et al. | 310/213 |

*Primary Examiner*—Thomas M. Dougherty
*Assistant Examiner*—Elvin G. Ewad
*Attorney, Agent, or Firm*—Thompson Hine & Flory LLP

[57] ABSTRACT

A stator lamination for an electric motor includes a plurality of notches extending about an inner periphery thereof shaped to minimize damage to insulation of the conductor during insertion of the conductor into the notches and removal of the conductor from the notches. Each notch includes two side walls which intersect the inner periphery of the laminate at a tapered angle. The side walls each include a cutout shaped to receive a retaining strip or slat therebetween, and the cutouts intersect the walls at tapered angles. The tapered angles are preferably less than about 12° or greater than about 14°, in order to prevent the formation of a locking taper.

7 Claims, 3 Drawing Sheets

ND HAVING A
STATOR LAMINATION DESIGN HAVING A TAPERED OPENING

BACKGROUND OF THE INVENTION

The present invention relates to stators for electrical motors and, more particularly, to a stator lamination design. Electric motors include a stator core which typically is made of a stack of thin, plate-like metal laminations. Such laminations typically are round, and have a central opening. Consequently, a stator core made up of a stack of such laminations is generally cylindrical in shape and includes a hollow, central cavity extending longitudinally about the central axis of the core.

The inner periphery of the core includes longitudinally-extending slots shaped to receive insulated conductors or windings, which may be wires or rods wound with fabric or fiberglass tape, that receive electric current that creates electric fields in the stator core. Such slots are formed in the stator core by stamping notches about the inner and outer peripheries of each lamination, and then stacking the laminations such that the notches in the laminations are aligned. Windings are retained in the core slots by flat strips of heavy cardboard which fit into cutouts formed in the profiles of the notches. Such cutouts are positioned radially outside of the windings in the notches.

U.S. Pat. No. 4,704,787 to Herzog et al. discloses a process for producing a core winding which shows a stator lamination having coil slots. An insulating plastic is provided between the stator winding rods and a wedge of insulating material is provided in a notch over the windings in order to seal the slot and retain the windings within the slot. A disadvantage of such conventional stator lamination shapes is that the slot profiles of the laminations have sharp corners located where the notch meets the outer periphery of the lamination, and where the cutouts meet the side wall of the notch. During conductor insertion and removal, the insulation can get "hung up" on these sharp corners and the sharp corners can cut into the insulation, ultimately exposing the conductor. Once the conductor is so exposed, the conductor must be repaired or replaced to avoid a short circuit.

Accordingly, there is a need for a stator lamination design which minimizes the likelihood of damage to the insulation covering the conductors sustained during insertion of the conductor into the core slot and removal of the conductor from the core slot.

SUMMARY OF THE INVENTION

The present invention is a stator lamination design which minimizes the likelihood of damage being sustained to the insulation sheathing the windings during insertion of the windings into, and removal of the windings from, the stator core slots. In a preferred embodiment of the present invention, a stator lamination is provided having notches about its inner and outer peripheries in which each notch is shaped to provide an outwardly tapering opening and in which the cutouts of the slot for receiving retaining strips have tapered edges on both radially inward and radially outward sides.

Also in the preferred embodiment, the angle of taper of the notch profile approaching and leaving the cutouts, as well as the corners of intersection between the notch and the periphery of the laminate, are either less than about 12° or greater than about 14°, thereby avoiding a locking taper.

Therefore, it is an object of the present invention to provide a stator lamination design which minimizes the likelihood of damage to the insulation covering the conductor during insertion and removal of the conductor; a stator lamination having notches whose notch profile consists of angled corners; a stator lamination having notches whose angled corners are all a non-locking tapered angles; and a stator lamination which is relatively easy to fabricate.

Other objects and advantages of the present invention will be apparent from the following description, the accompanying drawings and the appended claims.

DETAILED DESCRIPTION

Figure 1:
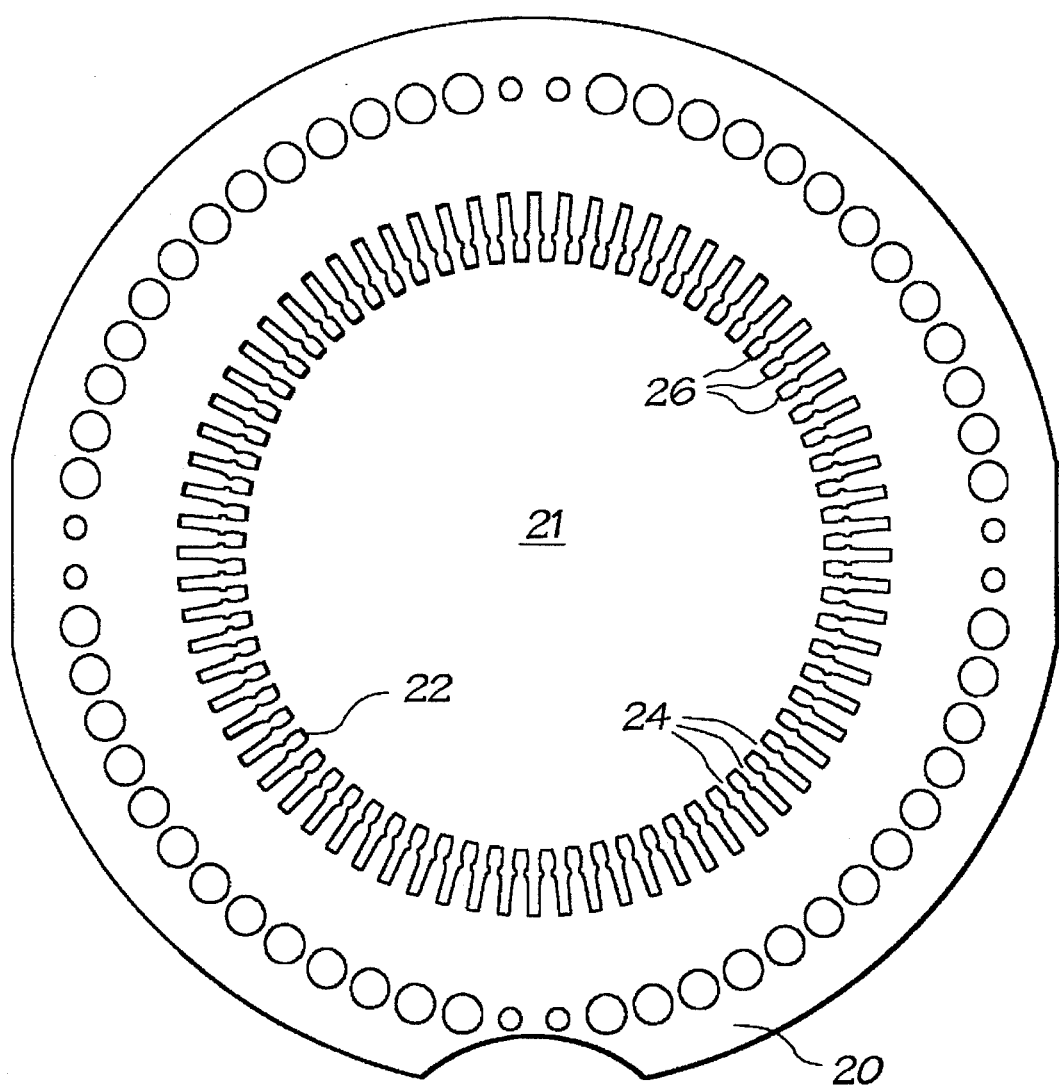
FIG. 1 is a plan view of the stator lamination of the present invention.

As shown in FIG. 1, a stator lamination of the present invention, generally designated 20, is fabricated from a thin, flat sheet of conductive metal, such as copper, which is stamped to form the shape of a ring having a central opening 21 defined by a radially inner periphery 22. A multiplicity of radially-extending notches 24 forming fingers 26 therebetween, are stamped into the lamination 20 such that they extend about the inner periphery 22 and communicate with the opening 21.

Consequently, when a number of such laminations 20 are stacked to form a cylindrical core, the resulting cylinder includes an inner surface in which the notches 24 line up to form a multiplicity of parallel, axially-extending grooves or slots. The purpose of these axially-extending slots is to receive stator windings (not shown), which in the case of large electric motors may comprise a stack of strips of copper bars or ribbon rather than round wire. The strips of copper ribbon are stacked and wrapped in fiberglass tape for insulation.

In the preferred embodiment, there are 72 equally spaced slots on a lamination 20 spaced 5° apart and as many as 1108 laminations are stacked together to form the stator core. The radius of each lamination may be 15.156 in. ±0.001 in.

Figure 2:
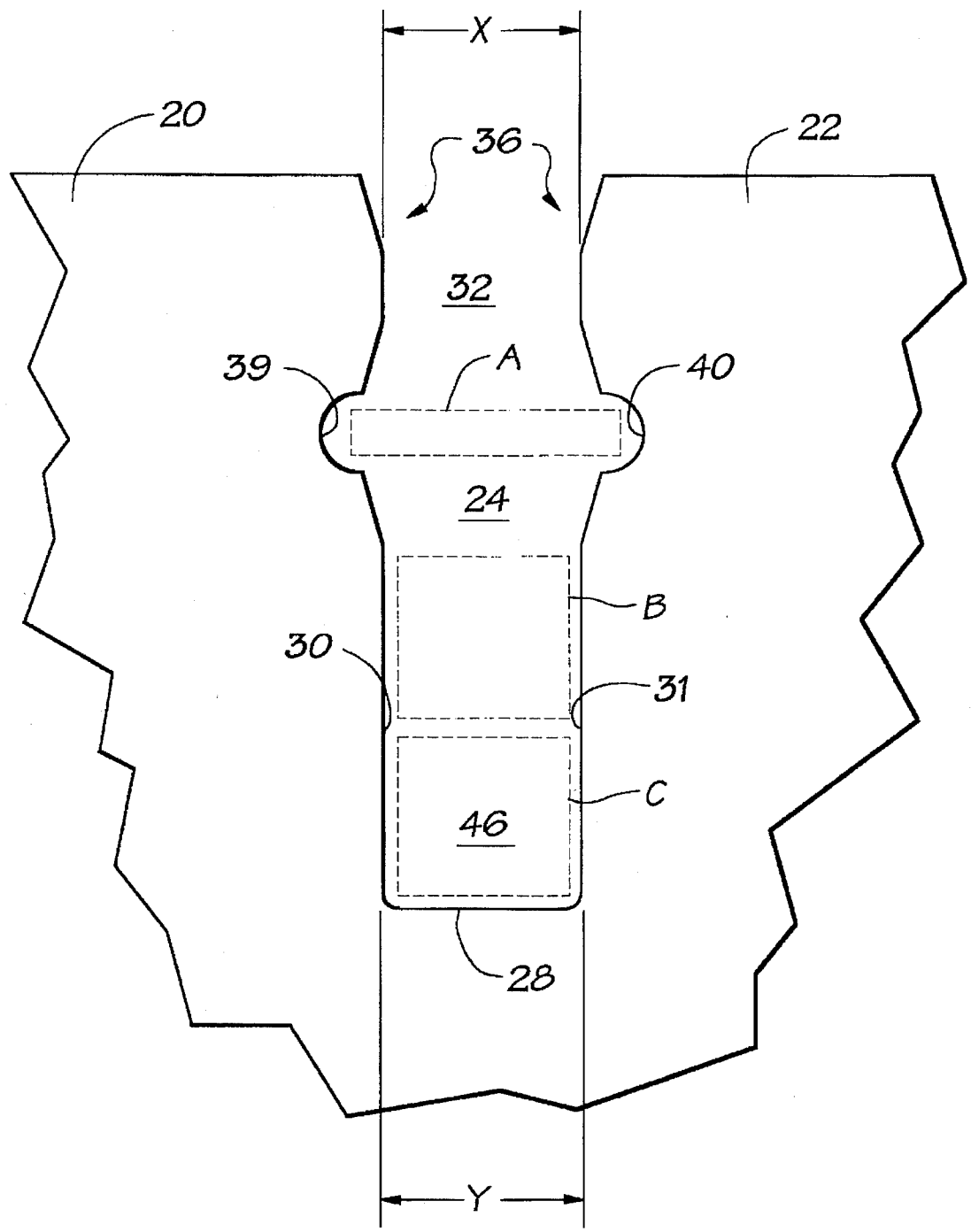
FIG. 2 is a detail of the lamination of FIG. 1, showing a notch.
Figure 3:
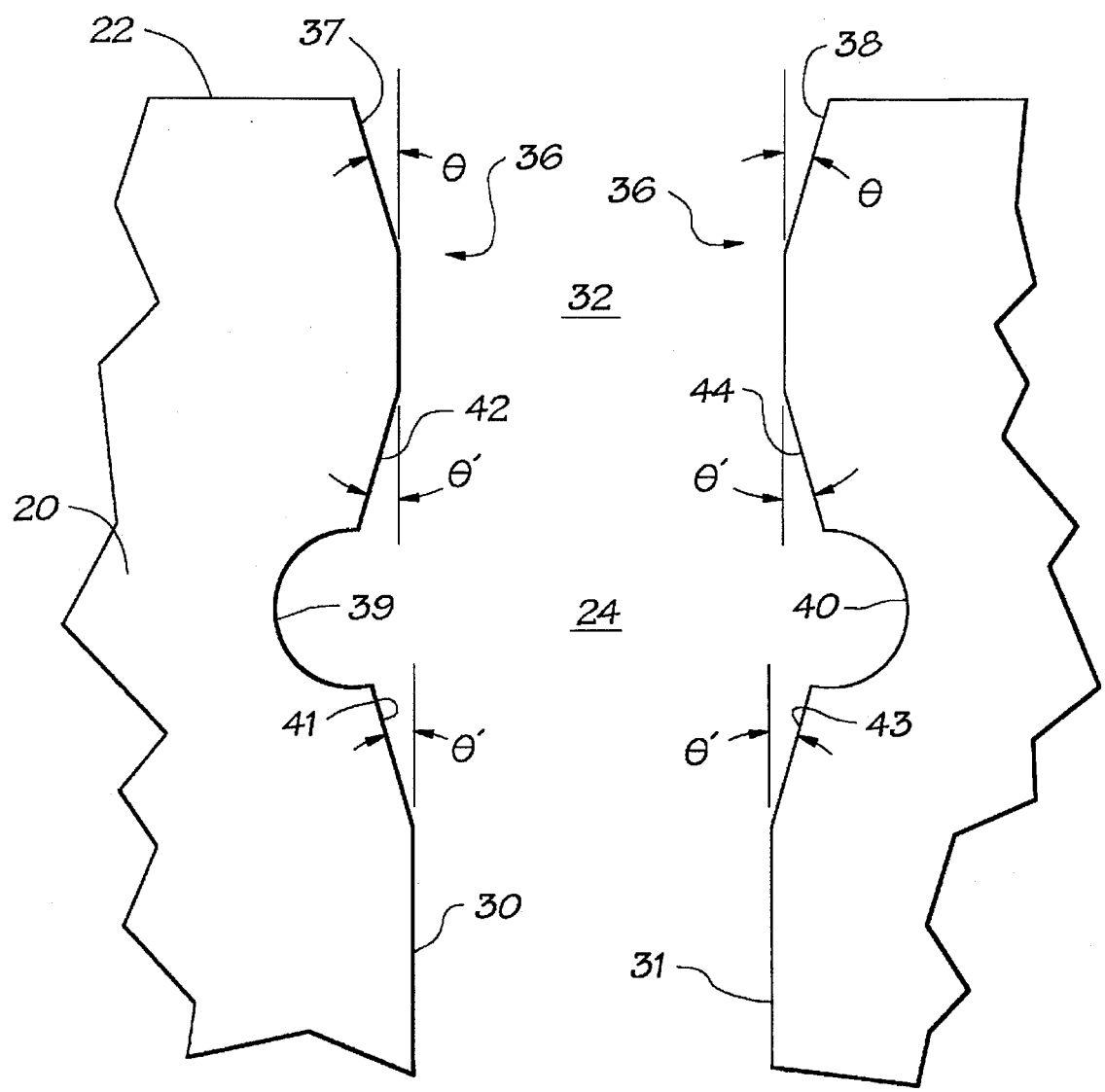
FIG. 3 is a detail of the notch of FIG. 2, showing the tapered corners.

As shown in FIG. 2, each notch 24 of the laminate 20 of the present invention includes an inner wall 28 and two substantially parallel side walls 30, 31. On the outer portion 32 of the notch 24, which faces the radially interior portion 21 of the ring 22, the side walls 30, 31 form an tapered opening, generally designated 36, which flares outwardly toward the interior opening 21. As shown in FIG. 3, opening 36 includes opposing angled walls 37, 38 formed on walls 30, 31, respectively. Walls 37, 38 intersect the side walls 30, 31, respectively to form an angle θ which is preferably less than 12° and greater than 14°, in order to avoid forming a locking taper.

As shown in FIG. 2, side walls 30, 31 have opposing, sidewardly extending cutouts 39, 40 which are shaped to cooperate to form a slot to receive conventional winding retaining strips or slats A. As shown in greater detail in FIG. 3, the inner and outer portions 41, 42 of side wall 30 and the inner and outer portions 43, 44 of side wall 40, which lead to and away from the cutouts 39, 40, respectively, intersect their contiguous side walls 30, 31 at angles θ'. As with angles θ, the preferred range for angle θ' is less than 12° and greater than 14°, in order to avoid forming a locking taper.

Returning to FIG. 2, the inner portion 46 of the notch 24 has a width Y sized to receive windings B and C. Width Y is slightly less than the width X of the outer portion 32. In a typical stator lamination according to the present invention, X=Y+0.010 in. where X=0.354 ±0.001 in. The length of notch 24 is typically about 1.457±0.001 in. and the distance from the cutouts 39, 40 to the inner wall 28 is 1.394±0.001 in. The width of space between the cutouts 39, 40 is 0.047 in., and the cutouts have a radius of 0.023 in. and the width between the cutouts 39, 40 measured from the outsides of both notches is 0.425±0.001 in.

To use the stator lamination 20 of the present invention, once a stack of laminations has been formed so that the notches 24 are aligned to form slots, windings A, B of insulated conductors are inserted into the formed slots. Between each of the windings, insulation is provided. The coils preferably have a width of Y−0.003 in. Finally, to hold the windings in place, an elongate strip or slat A is placed between cutouts 39, 40, of the laminations 20, which cutouts are aligned to form opposing grooves. The slat A is preferably made of paper or fiberglass reinforced plastic. Since the notch 24 has a profile in which the corners have been broken to form tapered walls 37, 38, 41, 42, 43, 44 as described above, the likelihood of the insulation covering the windings B, C catching on any sharp corners in the notch 24 which could tear the insulation is minimized. Further, in the preferred embodiment of the lamination 20, all the tapered walls form an angle $\theta$ which is less than 12° or greater than 14° This avoids the formation of a locking taper which otherwise would act to prevent the windings from sliding along the walls 30, 31 during insertion to the inner portion 46 of the notch 24.

Having described the invention in detail and by reference to preferred embodiments thereof, it will be apparent that modifications and variations are possible without departing from the scope of the invention defined in the appended claims.

What is claimed is:

1. A stator lamination comprising:

substantially flat plate means made of a conductive material, said plate having a plurality of notches formed therein; and each of said notches including an inner wall and two opposing side walls, such that an outer portion of said side walls intersect a periphery of said plate means to form an outwardly tapering opening, further comprising a cutout in said side walls, said cutout being shaped and positioned in oppposing relation to receive a retaining slat therebetween, and said side walls adjacent to said cutouts having tapered edges leading to and away from said cutouts, whereby insertion of windings into said notches and removal of windings from said notches is facilitated and damage to insulation on said windings is minimized.

2. The stator lamination of claim 1 wherein said tapered angles approaching said cutout are less than about 12°.

3. The stator lamination of claim 1 wherein said tapered angles approaching said cutout are greater than about 14°.

4. The stator lamination of claim 1 wherein said outwardly tapering opening forms an angle of less than about 12° with said side walls.

5. The stator lamination of claim 1 wherein said outwardly tapering opening forms an angle of greater than about 14°.

6. A stator lamination comprising:

a substantially flat plate having a central opening therethrough defined by an inner periphery;

a plurality of notches extending radially outwardly from, and being spaced about, said inner periphery;

each of said notches including an inner wall and two substantially parallel opposing side walls, an outer portion of said side walls intersecting a tapered wall which in turn intersects a periphery of said plate to form an outwardly tapering opening communicating with said central opening, said substantially parallel side walls each including a cutout, said cutouts being shaped and positioned in opposing relation to receive a retaining slat therebetween, and segments of said side walls adjacent to said cutouts are angled to form tapers opening to said cutouts, said outwardly tapering opening and said cutout tapers each forming an angle whereby insertion of windings into said notches and removal of windings from said notches is facilitated without said windings binding or being jammed against said cutouts or said outer portion, and damage to insulation resulting from catching on a juncture of said side walls with said inner periphery and on a juncture of said cutouts with said side walls is minimized.

7. The stator lamination of claim 6 wherein a distance between said parallel side walls defines a width of said notch and wherein a width of said inner portion of said notch is slightly less than a width of said exterior portion of said notch.

\* \* \* \* \*